United States Patent
Stern et al.

(10) Patent No.: US 10,140,285 B2
(45) Date of Patent: Nov. 27, 2018

(54) SYSTEM AND METHOD FOR GENERATING PHRASE BASED CATEGORIES OF INTERACTIONS

(71) Applicant: NICE LTD., Ra'anana (IL)

(72) Inventors: Jeffrey Stern, Tel Aviv (IL); Nimrod Cohen, Raanana (IL)

(73) Assignee: NICE LTD., Ra'anana (IL)

( * ) Notice: Subject to any disclaimer, the term of this patent is extended or adjusted under 35 U.S.C. 154(b) by 122 days.

(21) Appl. No.: 15/182,897

(22) Filed: Jun. 15, 2016

(65) Prior Publication Data

US 2017/0364506 A1    Dec. 21, 2017

(51) Int. Cl.
| | |
|---|---|
| G06F 17/27 | (2006.01) |
| G06F 17/30 | (2006.01) |
| G10L 15/26 | (2006.01) |
| G10L 25/51 | (2013.01) |
| G10L 25/06 | (2013.01) |
| H04M 3/51 | (2006.01) |

(52) U.S. Cl.
CPC .... *G06F 17/2775* (2013.01); *G06F 17/30598* (2013.01); *G06F 17/30705* (2013.01); *G10L 15/26* (2013.01); *G10L 25/06* (2013.01); *G10L 25/51* (2013.01); *H04M 3/5175* (2013.01); *H04M 3/5191* (2013.01)

(58) Field of Classification Search
CPC ...................... G06F 17/30598; G06F 17/30705
See application file for complete search history.

(56) References Cited

U.S. PATENT DOCUMENTS

| | | | |
|---|---|---|---|
| 7,996,393 B1 * | 8/2011 | Nanno | G06F 17/30696 707/723 |
| 9,792,905 B2 * | 10/2017 | Gorin | G10L 15/183 |
| 2002/0016787 A1 * | 2/2002 | Kanno | G06F 17/3061 |
| 2003/0093395 A1 * | 5/2003 | Shetty | G06F 17/30616 |
| 2004/0044950 A1 * | 3/2004 | Mills | G06F 17/2795 715/205 |
| 2006/0085405 A1 * | 4/2006 | Hsu | G06F 17/30011 |
| 2007/0118376 A1 * | 5/2007 | Mukerjee | G10L 15/063 704/245 |
| 2011/0153595 A1 * | 6/2011 | Bernstein | G06Q 10/107 707/722 |
| 2012/0330968 A1 * | 12/2012 | Lee | G06F 17/30722 707/748 |
| 2013/0275527 A1 * | 10/2013 | Deurloo | H04L 51/32 709/206 |

(Continued)

*Primary Examiner* — Samuel G Neway
(74) *Attorney, Agent, or Firm* — Pearl Cohen Zedek Latzer Baratz LLP

(57) ABSTRACT

In some embodiments, a system and method for generating phrase based categories of interactions may include obtaining a base category, the base category including one or more phrases. A base trend for the base category may be generated based on a frequency of appearance of at least one of the one or more phrases in a set of recorded interactions; a candidate phrase may be obtained and a candidate trend may be generated for the candidate phrase based on a frequency of appearance of the candidate phrase in the set of recorded interactions; a correlation level may be determined by relating the candidate trend to the base trend; and, if the correlation level is greater than a threshold level then the candidate phrase may be included the in the base category.

14 Claims, 7 Drawing Sheets

(56) References Cited

U.S. PATENT DOCUMENTS

| | | | |
|---|---|---|---|
| 2014/0019445 A1* | 1/2014 | Iwasaki | G06F 17/2775 707/725 |
| 2014/0149106 A1* | 5/2014 | Beretta | G06F 17/273 704/9 |
| 2014/0324966 A1* | 10/2014 | Farnham | H04L 51/20 709/204 |
| 2016/0073166 A1* | 3/2016 | Hu | H04N 5/765 725/20 |
| 2016/0155063 A1* | 6/2016 | Rich | G06N 99/005 706/12 |
| 2017/0109443 A1* | 4/2017 | Tsou | G06F 17/30864 |

* cited by examiner

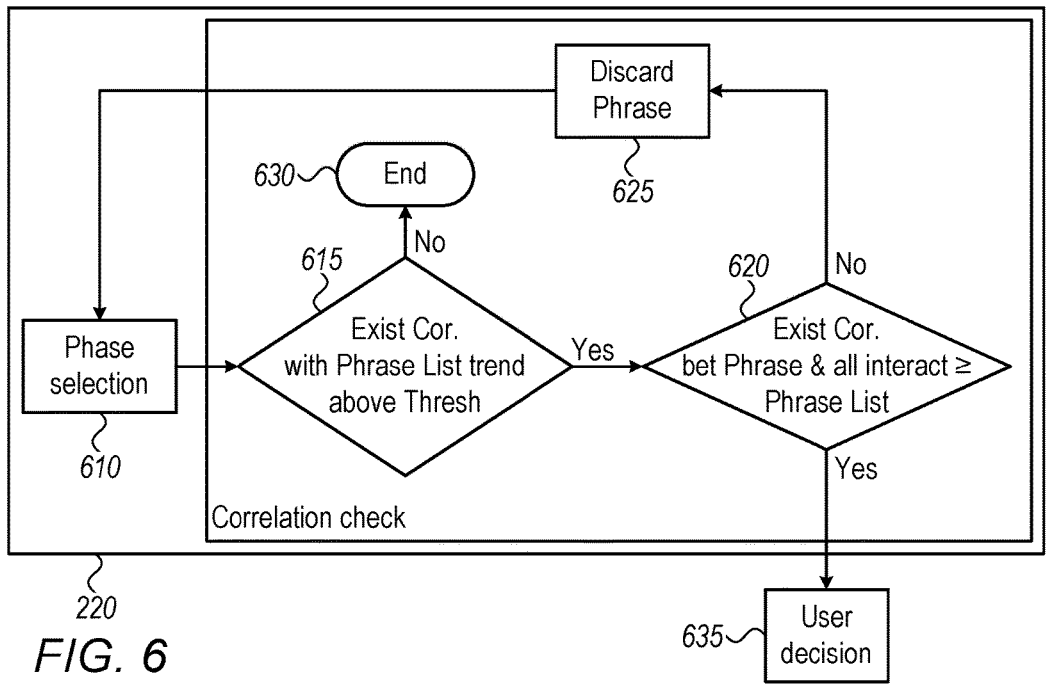
FIG. 6
FIG. 7
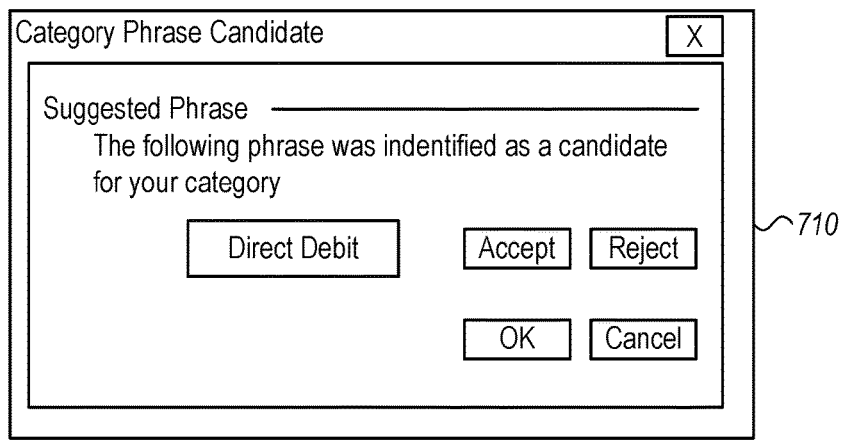
FIG. 8
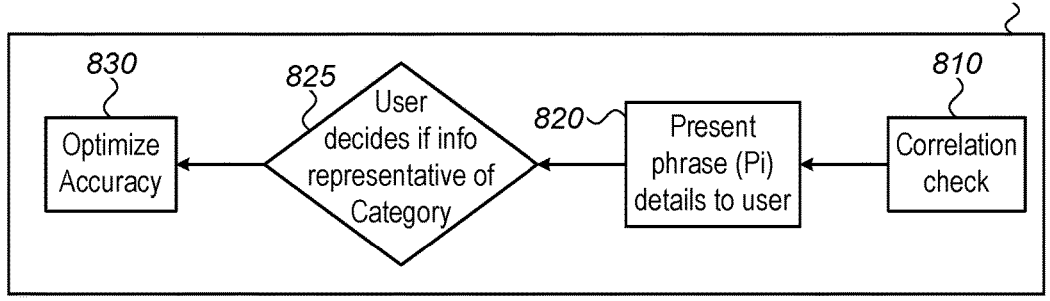

| Day | Base category-bill account pay 910 | Direct debit 915 | "Cancel My Contract" OR "Cancel the Contract" 920 | Bank account | Contract 925 | Debit |
|---|---|---|---|---|---|---|
| 2015-01-01T00:00:00Z | 117 | 10 | 9 | 6 | 82 | 46 |
| 2015-01-02T00:00:00Z | 235 | 26 | 20 | 14 | 171 | 67 |
| 2015-01-03T00:00:00Z | 207 | 27 | 15 | 9 | 127 | 63 |
| 2015-01-04T00:00:00Z | 199 | 22 | 13 | 10 | 120 | 70 |
| 2015-01-05T00:00:00Z | 258 | 31 | 20 | 13 | 174 | 78 |
| 2015-01-06T00:00:00Z | 251 | 23 | 19 | 12 | 159 | 79 |
| 2015-01-07T00:00:00Z | 280 | 27 | 17 | 9 | 173 | 82 |
| 2015-01-08T00:00:00Z | 240 | 29 | 16 | 12 | 154 | 67 |
| 2015-01-09T00:00:00Z | 248 | 19 | 22 | 8 | 137 | 60 |
| 2015-01-10T00:00:00Z | 172 | 22 | 11 | 8 | 118 | 52 |
| 2015-01-11T00:00:00Z | 153 | 7 | 11 | 8 | 100 | 74 |
| 2015-01-12T00:00:00Z | 295 | 36 | 16 | 14 | 178 | 94 |
| 2015-01-13T00:00:00Z | 255 | 26 | 14 | 8 | 163 | 75 |
| 2015-01-14T00:00:00Z | 243 | 27 | 17 | 11 | 172 | 79 |
| 2015-01-15T00:00:00Z | 253 | 29 | 14 | 11 | 153 | 80 |
| 2015-01-16T00:00:00Z | 197 | 26 | 16 | 14 | 141 | 57 |
| 2015-01-17T00:00:00Z | 168 | 18 | 18 | 8 | 105 | 52 |
| 2015-01-18T00:00:00Z | 165 | 27 | 11 | 8 | 118 | 78 |
| 2015-01-19T00:00:00Z | 288 | 41 | 28 | 13 | 193 | 94 |
| 2015-01-20T00:00:00Z | 252 | 43 | 16 | 14 | 183 | 110 |
| 2015-01-21T00:00:00Z | 335 | 54 | 26 | 16 | 230 | 94 |
| 2015-01-22T00:00:00Z | 238 | 26 | 17 | 13 | 152 | 64 |

FIG. 9

| 1110 | base category – bill account pay |
|---|---|
| base category - bill account pay | 1 |
| direct debit | 0.773145182 |
| "cancel my contract" OR "cancel the contract" | 0.766090433 |
| bank account | 0.495862571 |
| <u>contract</u> | <u>0.951046795</u> |
| debit | 0.669567095 |

SYSTEM AND METHOD FOR GENERATING PHRASE BASED CATEGORIES OF INTERACTIONS

FIELD OF THE INVENTION

The present invention relates generally to generating phrase based categories. More specifically, the present invention relates to generating phrase based categories for recorded interactions.

BACKGROUND OF THE INVENTION

Identifying recorded interactions, e.g., in a call center (where groups of service representatives interact with users or customers, for example by telephone but also by other communications methods) is a challenge faced by the industry. For example, identifying recorded interactions related to a specific product, service or issue can help a contact center better serve clients. Various systems and methods for identifying and/or categorizing recorded interactions, are known, e.g., categorizing recorded interactions based on phrases that appear in the interactions. An interaction may be for example a conversational exchange between one or more people, e.g. a verbal conversation, a conversation via e-mail, or a conversation via text message. Such interactions may be recorded, e.g., by audio recording, recordings of texts, etc.

Generally, the process of building phrase based categories (that may be used to identify interaction) as done by known systems and methods, is a long, tedious, and mostly manual effort that requires substantial knowledge and training. For example, in order to identify or categorize interactions, users (e.g., experts or other employees in a contact center) must run many queries and listen to calls to identify particular phrases that best represent the topic of the category that is being constructed. For each phrase identified, a user must determine how well the phrase contributes to the category by once again listening to many calls. After a category in constructed, the user must use sampling to best estimate the optimal accuracy of the category so that it will lower the amount of false positives, while increasing the amount of interactions it can identify.

Consequently, resulting categories produced by known systems and methods are less than ideal, e.g., due to the lack of expertise of categorization of the employee who handles the categorization and due to human errors. Other issues that further aggravate the problem may be imperfect phonetic or transcription engines (the output of which is used by employees when categorizing interactions), human inability to identify all relevant phrases and/or inability to correctly optimize detection versus accuracy. Moreover, time and money spent in the process may be substantial. Accordingly, while categorizing interactions is highly desirable in the industry, efficiently categorizing interactions is a challenge faced by the industry.

SUMMARY OF THE INVENTION

In some embodiments, a system and method for generating phrase based categories of interactions may include obtaining a base category, the base category including one or more phrases. A base trend (e.g., data or a description showing changes, description of change over time, graph of change over time), for a base category may be generated based on a frequency of appearance of at least one of the one or more phrases in a set of recorded interactions; a candidate phrase may be obtained and a candidate trend may be generated for the candidate phrase based on a frequency of appearance of the candidate phrase in the set of recorded interactions; a correlation level or value may be determined by relating the candidate trend to the base trend; and, if the correlation level is greater than a threshold level then the candidate phrase may be included the in the base category.

A candidate phrase may be repeatedly or iteratively selected from a set of candidate phrases, and, for each selected candidate phrase: a candidate trend may be generated for the selected candidate phrase; a correlation level for the selected candidate phrase may be determined; and, if the correlation level is greater than a threshold level then the selected candidate phrase may be included in the base category. A candidate phrase may be presented to a user and may be included in a base category based on input received from the user.

Generating a candidate trend may include for example: (a) determining a frequency of appearance of the candidate phrase, in the set of recorded interactions, by searching for the candidate phrase according to an accuracy value, (b) generating a first candidate trend based on the frequency of appearance determined using the accuracy value, (c) decreasing the accuracy value to produce a decreased accuracy value, (d) generating a second candidate trend using the decreased accuracy value, (e) determining a correlation level by relating the first candidate trend to the second candidate trend, and if the correlation level is greater than a threshold level then repeating steps a, b, c, d and e; and if the correlation level is less than a threshold then selecting, for generating the candidate trend, an accuracy value that is larger than the last decreased accuracy value used.

Generating a candidate trend may include ascertaining that the candidate trend is different from a trend of the number of interactions per a time period. An embodiment may ascertain or verify that a candidate trend is statistically more correlated to a trend of a base category than to a trend of the number of interactions in a time period. Obtaining a candidate phrase may include at least one of: receiving the candidate phrase from a user and identifying the candidate phrase by analyzing the set of recorded interactions. Recorded interactions may be or may include at least one of: a voice recording, a video recording and a recording of text of a textual interaction.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 6 shows a system and flows according to illustrative embodiments of the present invention;

FIG. 7 shows a screenshot of a user interface according to illustrative embodiments of the present invention;

FIG. 8 shows a system and flows according to illustrative embodiments of the present invention;

FIG. 9 exemplary trending values of a category and phrases according to illustrative embodiments of the present invention;

Figure 1:
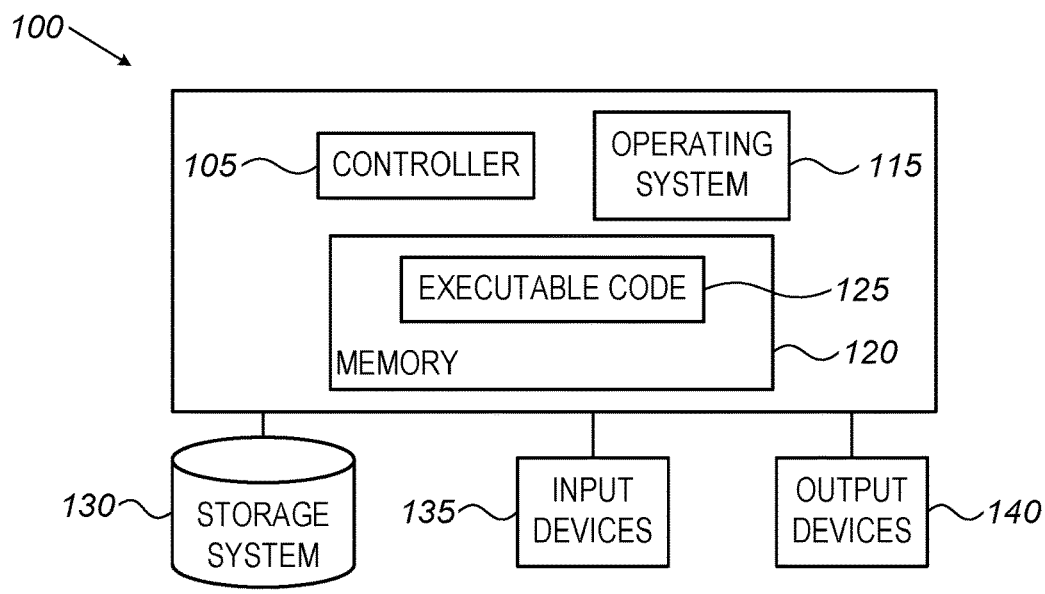
FIG. 1 shows high level block diagram of an exemplary computing device according to illustrative embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, showing a high level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. More than one computing device 100 may be included, and one or more computing devices 100 may act as the various components, for example the components shown in FIG. 2, e.g., service unit 220 and search engine 230 described herein may be, or may include components of, computing device 100. For example, by executing executable code 125 stored in memory 120, controller 105 may be configured to carry out a method of generating and updating phrase categories as described herein. For example, controller 105 may be configured to obtain a base (or reference) phrase category, the base phrase category including one or more phrases; generate a base trend for the base category based on a frequency of appearance of at least one of the one or more phrases in a set of recorded interactions; obtain a candidate phrase and generating a candidate trend for the candidate phrase based on a frequency of appearance of the candidate phrase in the set of recorded interactions; determine a correlation level or value by relating the candidate trend to the base trend; and if the correlation level or correlation value is greater than a threshold level then include the candidate phrase in the base category. Phrase categories, trends and correlation levels or values of trends are further described herein.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that generates, updates and uses phrase categories as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein (e.g., service unit 220) may be, or may include, controller 105, memory 120 and executable code 125.

Storage system 130 may be or may include, for example, a hard disk drive, an array of hard drives, a Compact Disk (CD) drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. An embodiment may additionally include other suitable hardware components and/or software components. In some embodiments, a system may include or may be, for example, a personal computer, a desktop computer, a laptop computer, a workstation, a server computer, a network device, or any other suitable computing device. For example, an embodiment as described herein may include one or more devices such as computing device 100.

Figure 2:
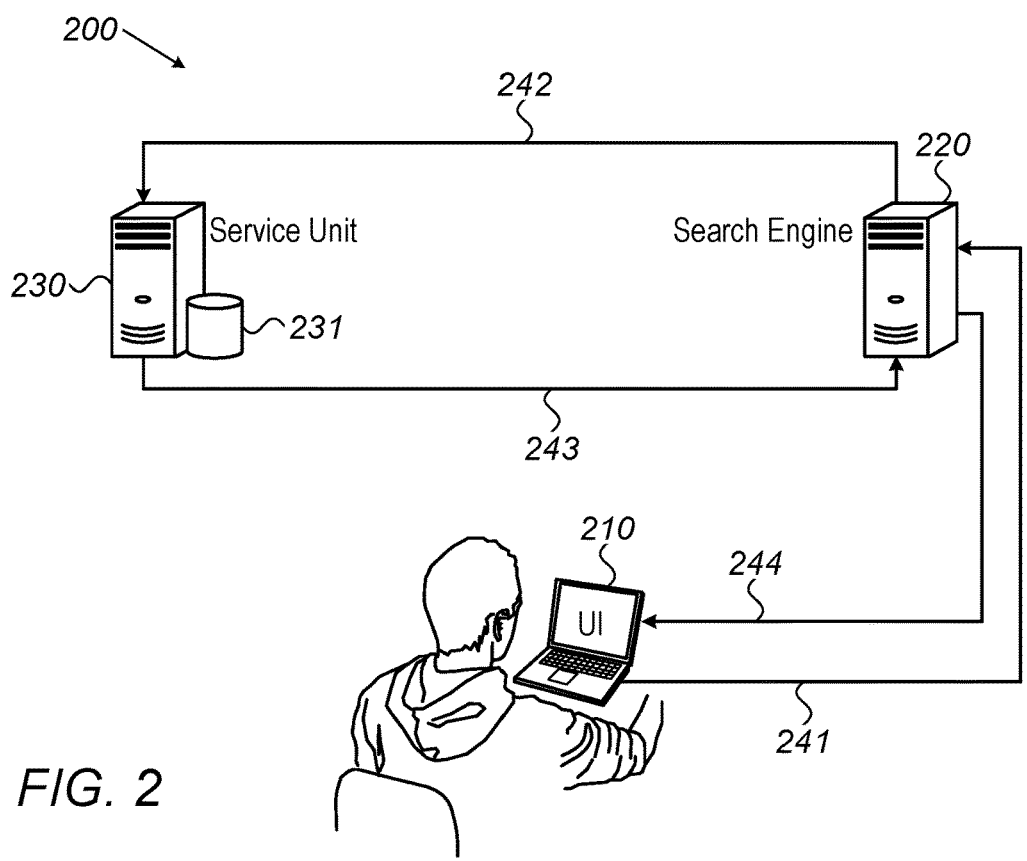
FIG. 2 shows a system and flows according to illustrative embodiments of the present invention.

Reference is made to FIG. 2, an overview of a system 200 and flows according to some embodiments of the present invention. As shown, an embodiment may include a user interface (UI) unit 210, a service unit 220 and a search engine 230 operatively connected to a storage system 231.

UI unit 210 may be any suitable device adapted to provide UI, e.g., a computer or smartphone that may include a desktop application or a web browser that provides a web-based interface. UI unit 210 may be adapted to receive queries, selections and other input from a user and present results or other information to a user. For example, and as further described herein, UI unit 210 may present a candidate phrase to a user and may, or may cause other components of system 200 to, include the candidate phrase in a base category based on input received from the user. The term phrase as referred to herein may be one or more words, e.g., "bill" or "close my account" may be phrases. In some embodiments, UI unit 210 may receive a candidate phrase from a user and may cause system 200 to use the candidate phrase as further described herein. The terms phrase base category, reference phrase category (or simply base category and reference category) as referred to herein may mean, or refer to a set, group or number of phrases, terms or words, e.g., one or more words. For example, a base category related to billing may be, or may include, the phrases "bill", "bill me" and "please bill my account".

Service unit 220 may provide an interface to search engine 230. For example, service unit 220 may receive search requests from UI unit 210, send the requests to search engine 230, receive responses from search engine 230, process the responses, e.g., generate and correlate trends for phrases and/or categories and provide results and data to UI unit 210 as further described herein.

Search engine 230 may be any search platform, e.g., one or more computing devices similar to computing device 100. Search engine 230 may be, or may include, any suitable computers, servers or services. For example, search engine 230 may be a SOLR (or Solr) search engine.

Storage system 231 may be, or may include, storage system 130. In some embodiments of the invention, storage system 231 may include a database that includes, or is used for storing, recorded interactions. Storage system 231 may be, or may include, any platform or system useable for archiving recorded interactions.

Recorded interactions archived, included or stored in, storage system 231 may be any recordings, e.g., a voice recording, a video recording, an audio recording of a telephone call, a recording of a chat or text message session. For example, a recorded interaction may be a file that includes text of a textual interaction, data usable by an embodiment to replay a conversation or any other information that may be captured and stored with respect to an interaction, e.g., an interaction of an agent with a caller or customer, an interaction of a customer with a web application and the like.

Search engine 230 may be adapted to deal with a large number of queries over what could be hundreds thousands of recorded interactions in storage system 231. Search engine 230 may be adapted to perform many comparison, aggregations and calculations that have to be accomplished with in a very short period of time. For this reason, suitable known textual search engines may be included in system 200 (e.g. the Solr or Elastic search platforms known in the art).

Search engine 230 may be adapted to perform facet functionality as known in the art. Accordingly, search engine 230 may be adapted to preform extremely fast queries that can identify text tokens in milliseconds. Using the Solr cloud known in the art, system 200 may be a distributed system that can scale up by just adding machines and memory and by dividing data to smaller ranges or groups, e.g., into sets of recorded interactions. The term "Faceting" as referred to herein relates to arrangement of search results into categories based on indexed terms. In some embodiments, searchers are presented with the indexed terms, along with numerical counts of how many matching documents were found for each term. For example, when providing facet functionality or facet service, search engine 230 may receive a query in the form of a phrase or set of phrases, and return the number of recorded interactions, stored in storage system 231, that include the phrase or set of phrases.

A trend as referred to herein may be a set of values, a plot, a curve or graph that represents a frequency or count with respect to time. In some embodiments, a trend of (or for) a phrase, word or category may be, may include or may be defined by, a set of values representing the number of recorded interactions that are associate with the phrase, word or category, in a respective set of time units. For example, if in a first day 3 interactions include the phrase "cancel my order", in a second (following) day 6 interactions include this phrase and in a third day 4 interactions include the phrase then a trend for the phrase "cancel my order" for the three days will be, will include or will be defined by the set of values 3, 6, 4. Of course, a trend may be defined for any time unit may be used for a trend, e.g., hours, minutes or months.

In some embodiments, a recorded interaction may be associated with a category, phrase, term or word if the interaction includes at least one word, term or phrase included in the category or phrase. For example, if a category includes the words "dog" and "cat" then both a first interaction that includes the word "cat" and a second interaction that includes the word "dog" may be associated with the category. Associating recorded interactions with categories, phrases, terms or words may include, or be achieved or done by examining a textual representations of the recorded interactions and searching, in the textual representations, phrases, terms or words that are included in a category or phrase. For example, a list or table may be used in order to reference, or point to, interactions that include a phrase included in a category such that the interactions are associated with the category. For example, a list, table or other known structures or objects may be used to associate or link recorded interactions to a category or phrase such that given a category, all interactions that are associated with or linked to the category may be readily identified, found and/or obtained. Accordingly, associating a set of recorded interactions stored in a database with a category may enable finding, in the database, all of the recorded interactions that are associated with the category.

Recorded interactions may be or may include any type of recording of an interaction. For example, any interaction of a client or customer with a contact or call center may be recorded. For example, recorded interactions may be or may include voice recordings, video recordings and a recordings of text (e.g., a recording of an interaction made by filling in forms in a web site, using a text messaging application etc.). Phrases, terms and words may be identified in recorded interaction as known in the art. For example, recorded interactions may include audio recordings as known in the art and speech to text (STT) or speech recognition may be used in order to generate textual representations of the recorded interactions. Accordingly, words, phrases and terms may be searched for and identified in, any type of recorded interactions. Recorded interactions may include a recording of any applicable interactions, e.g., interactions that include text messages, web based interactions that include an exchange of text between a user and an agent or an application (e.g., an interaction with a web site as known in the art) and the like. It will be understood that any interaction that can at least be represented by text may be used by embodiments of the invention as described herein.

For example, a trend of, or for, a phrase, or a trend for a category of two or more phrases, for a given time interval may be generated by counting, identifying or determining, for each day, hour, minute or any time resolution unit, all recorded interactions that include the phrase (or phrases of a category of phrases) and saving, per day, hour, minute or any other time unit or resolution, the number of recorded interactions that include the phrase. For example, a trend for the phrase "check my account" for three days may be the set values: 145, 687 and 122, showing a rise, in the second day, in calls in which the phrase "check my account" was mentioned or discussed. A trend for a category of phrases (or phrase category) may be generated or defined by counting, identifying or determining, for each time resolution unit, all recorded interactions that include at least one phrase included in the category of phrases (or in the phrase category).

A trend may be calculated or generated for interactions. For example, an interaction trend for a time period or interval may be the total number of interactions (e.g., archived or stored in storage system 231) per time unit. For example, an interaction trend for three days may be the set values: 345, 327 and 592, showing a rise in the total number of calls in the third day. Trends of categories may be correlated with an interaction trend. For example, if the above exemplary interaction trend (345, 327 and 592) and phrase trend (45, 687, 122) are for the same three days then an embodiment of the invention may determine that the trends do not correlate, e.g., since the interaction trend rises, or goes up, on the third day but the phrase trend rises, or goes up, on the second day. Generally, if two trends rise and fall, over the same time units, then they may be determined to be, or identified as, correlated, if two trends do not rise and fall, over the same time units, then they may be determined to be, or identified as, uncorrelated, and, if a first trend typically rises or goes up when a second trend falls or goes down then the trends may be considered by some embodiments of the invention as having a negative correlation. As described herein, the correlation of trends may be quantified and/or represented by a value that may indicate a correlation, no correlation or negative correlation.

A category, or a phrase category, may be, or may include, one or more phrases. For example, a "billing" category may include the phrases "check my bill", "bill me now" and "do not bill me". A trend for a category may be generated by counting, per each time unit, the number of recorded interactions that include at least one of the phrases in the category.

A correlation between trends may be calculated, identified, determined or quantified. A correlation level or correlation value calculated, by an embodiment, for two trends, may be, may express or represent, or may quantify, a difference between the two trends. A correlation level or correlation value calculated for two trends, by an embodiment, may express or represent, or may quantify, a difference in behavior of the two trends. For example, if along a timeline, a first trend rises or goes up, while a second trend falls or goes down then the trends may be considered as behaving in an inverse manner, and the correlation level or value that may be calculated, by an embodiment, for the two trends, may shift towards, or be close to, minus one ("−1"). Similarly, if both trends go up and down at the same times over or along a timeline (namely, behave in a similar way or manner), then the correlation level or value that may be calculated for the two trends, by some embodiments, may shift towards, or be closer to, plus one ("+1").

For example, a level or value of a correlation between trends may be calculated, identified, determined or quantified using values (x and y) of the two trend using Formula 1 below, which may express a correlation level or correlation value:

$$R(X, Y) = \frac{\Sigma(x - \bar{x})(y - \bar{y})}{\sqrt{\Sigma(x - \bar{x})^2 \Sigma(y - \bar{y})^2}} \quad \text{Formula 1}$$

Where X and Y are values of two trends during a time period and $\bar{x}$ and $\bar{y}$ are the sample means averages of X and Y. Other or different formulas for correlating or comparing two trends may be used.

Accordingly, if the value of R(X,Y) is close to "+1", then the correlation level or value is high and it indicates a strong positive correlation (or that the trends represented by the X and Y values in Formula 1 are highly correlated), and if the value of R(X,Y) is close to "4", (the correlation level or value is low or small) and it indicates a strong negative correlation, that is, the trends are uncorrelated, e.g., when one trend goes up along a timeline, the other trend goes down.

Accordingly, the level or degree of a correlation between trends may be determined or identified, by some embodiments of the invention based on a correlation value calculated as described. For example, a value of, or close to, one ("1") may indicate, and may be used by some embodiments to determine or identify, a strong correlation between trends, similarly, a value of, or close to, minus one ("−1") may indicate, and may be used by some embodiments of the invention to determine or identify, a negative correlation between trends, e.g., the trends change in opposite directions along a time line or the trends behave in an inverse manner. A value of, or close to, zero ("0") may indicate, and may be used by some embodiments of the invention to determine or identify, that the trends are in no way correlated. In some embodiments, regardless of whether the correlation value approaches zero ("0") from a negative or positive direction, a decrease in the correlation value is interpreted as a decrease of, or less, correlation between the trends and a value of zero ("0") may mean (and cause an embodiment to determine) that the trends are uncorrelated.

Categorizing interactions may be, or may include, associating interactions with a category. For example, a list, table or pointers as known in the art may be used in order to record or indicate that an interaction is associated with (or included in) a category. For example, a category of interactions may be a list of all recorded interactions (e.g., a list of file names) that are associated with, or included in the category. An interaction (or a recorded interaction) may be associated with a category (or phrase category) if at least one of the phrases included in the category is present and/or detected in the interaction or recorded interaction.

As described, a system and method according to some embodiments of the invention may construct optimal categories of interactions with a fully-automated process. A system and method according to some embodiments of the invention may utilize correlations to statistically correlate interactions to categories or phrases. A system and method according to some embodiments of the invention may identify relevant words and phrases based on a level or value of a correlation of a trend of their appearance to a trend of interactions. Accordingly, words and phrases that a user may not have thought of as belonging (or relevant) to a category may be identified. For example, by identifying or determining a strong correlation (e.g., R=+0.9 in Formula 1) between trends of a first phrase and a second phrase, a system and method according to embodiments of the invention may identify that the two phrases are related to a common issue or problem.

As further described, a system and method according to some embodiments of the invention may enable or provide an automated procedure that includes a recommendation wizard that may offer, to a user, phrases that may be candidates for a category. As known in the art, some current or known solutions provide a user with "tips in assisting". These tips are usually based on phonetically STT problematic terms that are found to have false positives and include asking a user if the word identified might be incorrect. In contrast, a system and method according to some embodiments of the invention may determine statistical relationships between words and phrases leveraging their correlation to determine what should be offered to user.

Accordingly, some systems and methods according to the invention do not need, or require, to "understand" a phrase itself (or the meaning of the phrase), rather, its relationship to other phrases or to categories is used. Moreover, phrases suggested to a user may not only relate to simply correcting mistakes that might be identified due to problematic texts (as in known systems, methods and/or products) but rather, phrases suggested to a user by some embodiments may be phrases (e.g., new phrases automatically identified by an embodiment) that might be essential, or relevant to a category. For example, using statistical trending as described, phrases that are relevant to a category may be identified and may be suggested, to a user, as an addition to a category.

A system and method according to some embodiments of the invention may create or update a category based on input received from a user, e.g., a user may indicate that a candidate phrase (suggested by an embodiment) is to be included in a category and an embodiment may update the category to include the phrase.

As further described, a system and method according to some embodiments of the invention may enhance category exactness by determining an optimal accuracy levels per phrase. For example, a system and method according to some embodiments of the invention may dynamically and/or iteratively change an accuracy level and a detection level for a phrase such that an optimal accuracy level vs. a detection level is achieved.

Figure 3:
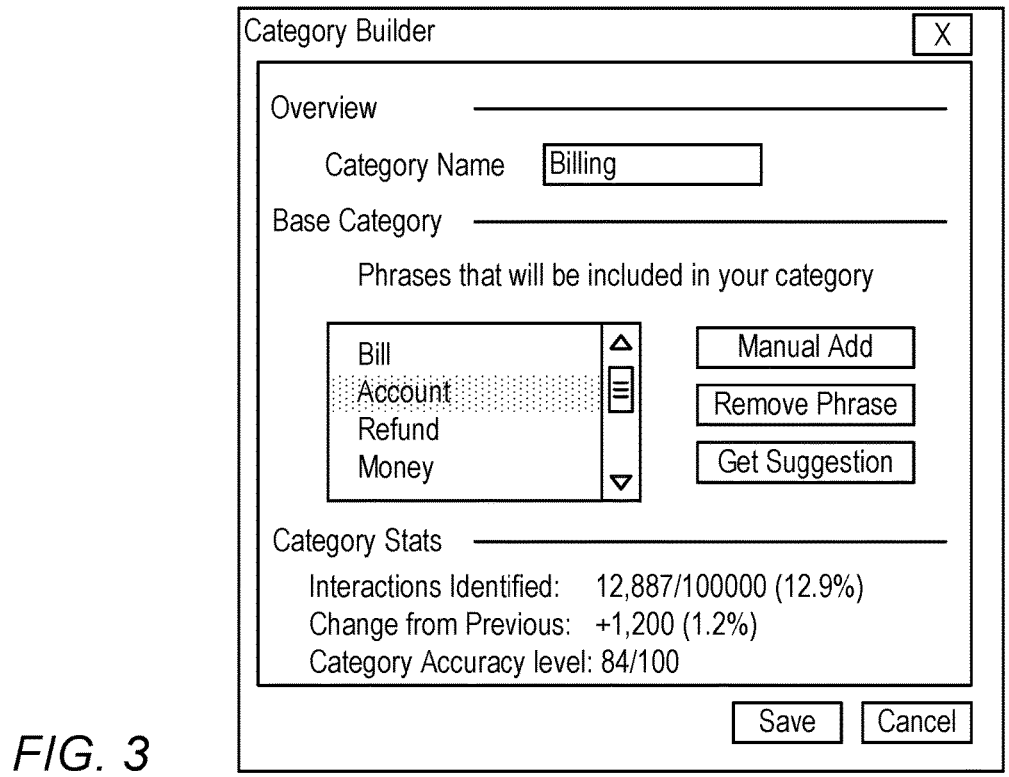
FIG. 3 shows a screenshot of a user interface according to illustrative embodiments of the present invention.

As shown by arrow 241, UI unit 210 may send to service unit 220 a base or reference category (or phrase category) that may be defined by, and/or received from, a user. A base category may be referred to herein as a reference category and the terms "base category", "reference category", "base phrase category" and "reference phrase category" may mean the same thing and be used herein interchangeably. Reference is additionally made to FIG. 3 that shows an exemplary screen for defining a base category as may be provided by UI unit 210. As shown by FIG. 3, a user may select a few phrases for a "base category", e.g., phrases that best describe a category the user is interested in defining. For example, and as shown, a user may define a "Billing" category and select phrases such as "refund", "bill" and "money" to be included in the "Billing" category.

As shown by arrow 242, based on a category (or one of more phrases) received from UI unit 210, service unit 220 may send a query or request to search engine 230. For example, a request includes a set of phrases for which a trend is requested. As shown by arrow 243, search engine 230 may return or respond with a trend. For example, given, or provided with, a phrase (or a category or set of phrases), a time period and a time resolution unit, search engine 230 may return an array or set of values (e.g., integers as known in the art) the include or represent, for each time resolution unit, the number of recorded interactions that include at least one of the phrases. A trend provided by search engine 230 may be for a time period included in a request as described. Accordingly, a system and method according to some embodiments of the invention may generate a trend for a reference or base category, for example, a trend for the "Billing" category in the above example may be created based on the number of recorded interactions that include at least one of the refund", "bill" and "money" words.

System 200 may generate a trend for a specific phrase (also referred to herein as a phrase-trend) and may determine a correlation of the phrase-trend to a trend of a category (also referred to herein as a category-trend). For example, as described herein, service unit 220 may receive from search engine 230 a trend for the phrase "direct debit" and may determine or quantify the correlation of the phrase-trend of "direct debit" with the category-trend of the Billing category as described in the above example. If a high or positive correlation between a phrase-trend of a phrase and a category-trend is identified (e.g., R in Formula 1 is close to +1) then, as shown by arrow 244, service unit 220 may suggest to a user to add the phrase to the category.

For example, after the "Billing" base category was defined as described (and a trend was produced as described), service unit 220 may determine the correlation of a phrase-trend of the phrase "pay soon" with the category-trend of "Billing" is above a threshold (e.g., R in Formula 1 is greater than 0.85) and may suggest to a user to add the phrase "pay soon" to the "Billing" category. A base category may be updated or modified based on input from a user. For example, the user may accept or decline a suggested phrase. If a user accepts a suggestion, e.g., by clicking a checkbox, then service unit 220 may add the suggested phrase to the base category (or to any other category as indicated by a user).

Below is example of a request that may be sent, by service unit 220 to search engine 230 and of a response returned by search engine 230. As shown, a request for the number of interactions that include the phrase "bill" ("q":"bill"), on each day ("facet.range.gap": "+1 DAYS"), starting Jan. 1, 2014 ("facet.range.start": "2014-01-01T00:00:00Z"), until Jan. 1, 2016 ("facet.range.end": "2016-01-01T00:00:00Z") may be sent. Other syntaxes, languages, and requests may be used.

Facet Response Example:

```
{
    "responseHeader":{
        "status":0,
        "QTime":15,
        "params":{
            "facet":["true",
                "true"],
            "indent":"true",
            "q":"bill",
            "facet.range.start":"2014-01-01T00:00:00Z",
            "facet.range":"contactGMTStartTime_dt",
            "facet.range.end":"2016-01-01T00:00:00Z",
            "facet.range.gap":"+1DAYS",
            "f.contactGMTStartTime_dt.facet.mincount":"1",
            "wt":"json",
            "rows":"0"}},
"response":{"numFound":7842,"start":0,"maxScore":31.466272,"docs":[
]
    },
    "facet_counts":{
        "facet_queries":{ },
        "facet_fields":{ },
        "facet_dates":{ },
        "facet_ranges":{
            "contactGMTStartTime_dt":{
                "counts":[
                    "2014-04-28T00:00:00Z",35,
                    "2014-04-29T00:00:00Z",84,
                    "2014-04-30T00:00:00Z",106,
                    "2014-05-01T00:00:00Z",90,
                    "2014-05-02T00:00:00Z",85,
                    "2014-05-03T00:00:00Z",43,
                    "2014-05-04T00:00:00Z",45,
                    "2015-03-04T00:00:00Z",44,
                    ...... .
                    "2015-04-27T00:00:00Z",455],
                "gap":"+1DAYS",
                "start":"2014-01-01T00:00:00Z",
                "end":"2016-01-01T00:00:00Z"}}}}
```

As shown, the response may include an array of pairs, each one having date and the number of interactions on that date, that is 35 interactions on Apr. 28, 2014 ("2014-04-28T00:00:00Z",35), 84 interactions on Apr. 29, 2014, 106 interactions on Apr. 30, 2014 and so on. As can be seen by "QTime":15" the above exemplary query took 15MS to execute on a Solr system. Service unit 220 may generate a trend based on the above response, e.g., a trend for April $29^{th}$ until May $4^{th}$ with the values of 84, 106, 90, 85, 43, 45. It will be understood that the above exemplary response is provided as an example and that any request and response may be used in order to obtain data that may be used as described herein, e.g., data usable for generating trends as described.

In some embodiments, an optimal balance between accuracy related to detecting a phrase in recorded interactions and detection rate or level of the phrase may be automatically determined and a phrase may be identified and included in a category based on the balance.

An accuracy level or value as referred to herein relates to the distance or difference between a phrase and matching phrases found. An accuracy level or value in detecting a phrase may be a configuration parameter or value provided to search engine 230. An accuracy level or value in detecting a phrase may be a value returned by search engine 230. For example, in order to search for recorded interactions that include a specific phrase, service unit 220 may provide search engine 230 with the phrase and with an accuracy value and search engine 230 may search for the phrase, in recorded interactions stored in storage system 231 based on, or using the, accuracy value. In other cases, search engine 230 may provide an accuracy value (also known in the art as a confidence value) when providing results. For example, when returning responses as described, search engine 230 may indicate the accuracy or confidence level, e.g., a response may include a first list or number of recorded interactions in which a specific phrase was found with a first (e.g., high) confidence or accuracy level or value, a second list or number of recorded interactions in which the same specific phrase was found with a second (e.g., lower) confidence or accuracy level or value and so on. In order to select an accuracy level or value, service unit 220 may select responses received from search engine that are associated with the desired accuracy or confidence level or value. For example, if, in response to a search request, search engine 230 returns a number of sets of recorded interactions in which the phrase was found, and an accuracy or confidence level for each set, then, according to the desired accuracy or confidence level or value (e.g., selected by repeatedly or iteratively decreasing the accuracy level as described), service unit 220 may select only the set of recorded interactions that are associated with a desired accuracy value and ignore recorded interactions that have an accuracy value that is lower than the desired value.

For example, using a high accuracy value when searching for the phrase "bill me today", search engine 230 may return, in a response, only the number of recorded interactions that include exactly the phrase "bill me today". Using a lower accuracy level or value in the same request or query may cause search engine 230 to return, in a response, the number of recorded interactions that include the phrases that sound like "bill me today", e.g., "billing me today" or "bill mom today". Based on a configuration parameter or accuracy value, the level of similarity of phrases identified by search engine 230 may be controlled. For example, search engine 230 may be configured, e.g., by service unit 220, to identify only similar phrases that do not miss more than one word in a phrase searched for, or that include the same number of words in the phrase searched for, e.g., when searching for "bill me today", "billing me today" may be identified as a match but "bill her" may be excluded from the results.

In some embodiments, each identification, by search engine 230, of an individual or specific phrase in a recorded interaction, may be given, by search engine 230, an accuracy (or confidence) level or value that indicates how confident search engine 230 is that it indeed identified or found the correct or exact phrase in the recorded interaction.

For example, as known in the art, if a recorded interaction has, or includes, noise in the background, strong accent, a speaker who speaks really fast or a phrase that sounds like many other phrases, it is more difficult (e.g., for search engine 230) to be confident or sure that the phrase was indeed identified in the recorded interaction. Search engine 230 may determine or quantify the confidence or accuracy level or value related to finding a phrase in a recorded interaction and may provide the accuracy level or value, e.g., with a response it provides as described herein.

Generally, the lower the accuracy level or value, the more interactions that will be found or identified when searching for a phrase, yet, a low confidence or accuracy value may increase in false positives (e.g., wrongly determining that a phrase was found in a recorded interaction). So, for example, with a low confidence or accuracy level or value, instead of finding, in recorded interactions, the phrase "bill me today", search engine 230 might find "bill my total" and/or "by me today" and include interactions that include these phrases in a response. By varying the accuracy or confidence value or level, embodiments of the invention may enable a broad search and may thus find various constructions of the same term or phrase in recorded interactions.

A detection rate may be related to the number of recorded interactions found or identified based on a phrase in a query. Accordingly, the lower is the accuracy the higher is the detection rate, e.g., if three recorded interactions in storage system 231 include the phrase "bill me today", and two recorded interactions in storage system 231 include the phrase "bill today" then, using high accuracy when searching for "bill me today" may yield a detection rate of three (e.g., the three recorded interactions that include the phrase "bill me today" will be found) but using a lower accuracy value or level when searching for "bill me today" may yield a detection rate of five since, using a lower accuracy may cause search engine 230 to identify recorded interactions that include the phrase "bill me today" and recorded interactions that include the phrase "bill today" as a match. An accuracy with respect to searched terms is a feature provided by various systems known in the art, e.g., the Solr search engine. Accordingly, an accuracy value or level according to which phrases, words and/or terms are searched for in recorded interactions may be a parameter that is dynamically set, e.g., by service unit 220 when searching for recorded interactions using search engine 230 as described.

In some embodiments, a number of accuracy values may be used for searching the exact or same term, phrase or word. For example, when searching for the phrase "bill me today" with different accuracy values, the same phrase "bill me today" is repeatedly searched for using different accuracy values. As described, when searching for the same exact phrase using different accuracy values the results differ, e.g., the lower the accuracy value the larger is the number of recorded interactions found by search engine 230.

In some embodiments, an optimized accuracy for each phrase in a category may be determined and phrases may be added to a category based on the optimized accuracy. For example, service unit 220 may repeat or iterate over some or all phrases in a category and, for each phrase, identify recorded interactions that include the phrase using a first (e.g., high) accuracy and generate a first trend for the phrase as described. Service unit 220 may then use a second, lower accuracy, and generate a second trend for the phrase based on the lower accuracy. Next, service unit 220 may determine the correlation between the first and second trends. If the correlation is higher than a threshold (e.g., R in formula 1 is greater than 0.9) then an accuracy lower than the accuracy used for the second trend may be used in order to generate a third trend and service unit 220 may determine the correlation between the second and third trends. The process of lowering the accuracy, generating a new trend and determining a correlation level or value between the new (or last) trend and the previous (one before last) trend may be repeatedly or iteratively performed until the correlation between the last trend and the previous (or one before last) trend falls below a threshold (e.g., R in formula 1 is less than 0.6). If or when the correlation between the last trend and the previous trend is below a threshold, service unit 220 may select the accuracy level or value used for the previous, or one before last trend and use the selected accuracy for associating recorded interactions with the category. As described, the process may be repeated for all phrases in a category.

Figure 4:
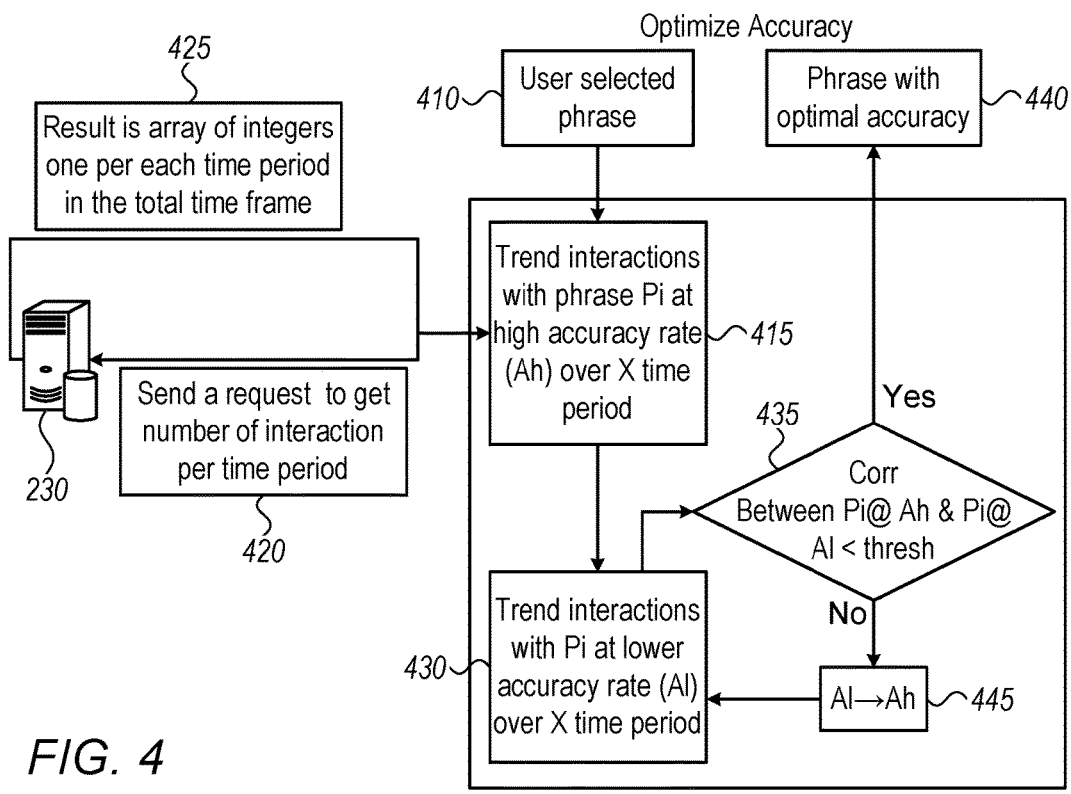
FIG. 4 shows a system and flows according to illustrative embodiments of the present invention.

Reference is made to FIG. 4 which shows a system and flows according to illustrative embodiments of the present invention. As shown by block 410, a phrase may be selected, e.g., a user selects a phrase as shown. For example, a phrase may be selected by a user or the phrase may be selected by service unit 220, e.g., service unit 220 may repeatedly or iteratively select phrases, one by one, from a base category as shown by block 410. As shown by block 415, a first trend for a phrase (denoted as phrase Pi) may be generated, for a time period (denoted as X time) using a first, initial or high accuracy (denoted Ah). For example, and as shown by blocks 420 and 425, a request to get the number of interactions per time period may be sent to search engine 230 (that may be a Solr platform or system as indicated) and a response returned by search engine 230 may include the number of recorded interactions, in storage system 231, that include phrase Pi (e.g., as shown by block 425). As shown by block 430, a second trend (for the same time period denoted X) for phrase Pi may be generated using a lower accuracy (denoted Al). As shown by block 435, a correlation value may be calculated or determined for the first and second trend, e.g., the value of R in formula 1 may be calculated based on values in the first and second trends as described. As denoted by "correlation between Pi@Ah & Pi@Al<thresh", the correlation of a trend of phrase Pi with high accuracy (or accuracy high denoted by Ah) with a trend of phrase Pi with low accuracy (or accuracy low denoted by Al) may be compared to a threshold (denoted as thresh) and, if the correlation is smaller than the threshold then the flow may proceed to block 440, else and as shown, the flow may proceed to block 445. As shown by block 435, a system and/or method according to some embodiments may check if the correlation level or value is less than a threshold and, if so, as shown by block 440, an optimal accuracy for the phrase may be saved and used for the phrase. Accordingly, an optimal accuracy may be calculated for each phrase in a category. When generating a trend for a category, e.g., by enumerating the number of recorded interactions that include at least one of the phrases included in the category, each phrase in the category may be searched for, in recorded interactions, using its own optimal accuracy, determined as described herein.

As shown by block 445, if the correlation calculated as shown by block 435 is greater than a threshold then the value of the lower accuracy (Al) may be used for the high accuracy (e.g., Ah is set to be or include the value of Al as denoted by Al→Ah), a new lower accuracy (Al) may be set, e.g. by a decrease of 5% of Ah, and the process may be repeated from block 415 with the new high and low accuracies.

In some embodiments, a category or list of phrases may be automatically created, generated, expanded or updated. In some embodiments, phrases for inclusion in a category may be automatically identified, selected and/or included in the category.

Figure 5:
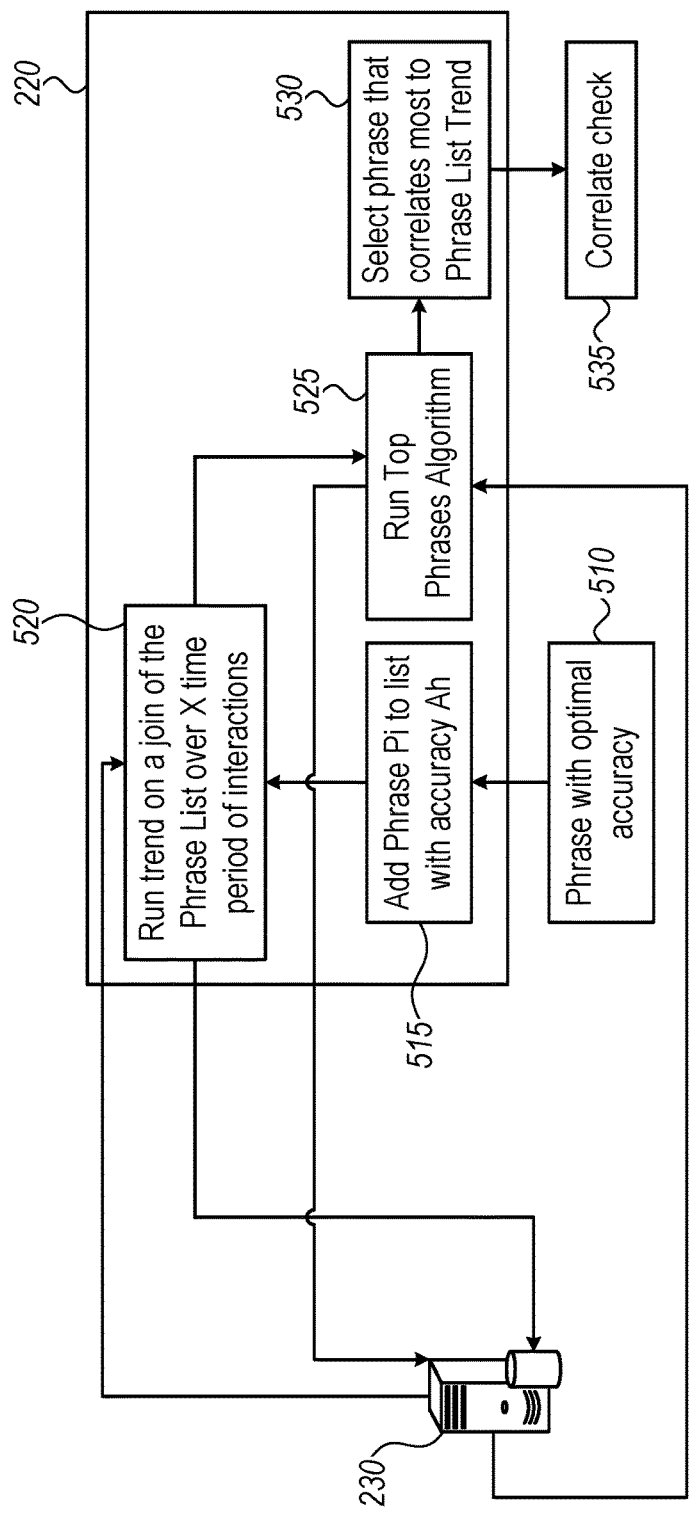
FIG. 5 shows a system and flows according to illustrative embodiments of the present invention.

Reference is made to FIG. 5 which shows a system and flows according to illustrative embodiments of the present invention. As shown by block 510, a phrase may be selected or obtained as input, for example, the output phrase with optimal accuracy of a method described with reference to FIG. 4 may be provided as input. For example, a phrase may be selected by a user or by a method or process as described with respect to FIG. 4.

As shown by block 515, a phrase may be added to a list or category, e.g., added to a base or reference category described herein. As shown, the phrase may be added with its high accuracy value, level or setting (denoted Ah in block 515).

As shown by block 520 (and the arrows connecting blocks 520 and 230), a trend for the list or category (e.g., a reference category that now includes the phrase add as shown by block 515) may be generated as described. For example, the number of recorded interactions that include at least one of the phrases in the list of phrases created as shown by block 515, per day, hour or other time interval or resolution, may be returned by search engine 230 as described herein. As further shown, in addition to a category-trend or list-trend, an interaction trend may be provided by search engine 230, e.g., an interaction trend (or interactions-trend) provided may be the total number of interactions per day, hour or other time interval or resolution.

As shown by block 525, a top phrase algorithm or logic may be executed in order to identify, based on the number of appearances in recorded interactions, the top, most frequent or most popular phrases. For example, service unit 220 may iterate over all phrase in a list or category (e.g., the list created as shown by block 515), determine or identify, for each of the phrases, the number of appearances in the recorded interactions and sort the phrases according to the number of appearances. Service unit 220 may then select the top phrases in the sorted list, e.g., select the top 10, 20 or 25 phrases. Accordingly, the set of phrases in a list that appear, in a set of recorded interactions, more than other phrases in the list may be identified and selected.

In some embodiments, a top phrase algorithm or logic as shown by block 525 may identify new phrases, e.g., phrases not included in a category or list. For example, a top phrase algorithm or logic may identify relevant phrases or words which are not included in a list generated as shown by block 515. For example, using search engine 230 as described, service unit 220 search, in recorded interactions associated with a category or list of phrases, for the most popular phrases in the recorded interactions. For example, a list or category of phrases (e.g., a base category as described) may include the words "bill", "account", "pay", "charge" and "money", and, when examining recorded interactions that include these words (also referred to herein as recorded interactions that are associated with the category of phrases), service unit 220 may identify that the "top words" or "top phrases" in these recorded interactions are "cancel my contract", "cancel the contract", "cancel my account", "receive a letter", "direct debit", "debt collector", "debt collection", "debt collection agency", "month contract", "price plan", "check my account" and "pay my bill". For example, using services provided by a Solr system or platform as known in the art, the frequency of appearance of words and phrases may be determined. Accordingly, a list of the most frequent phrases in a set of recorded interactions may be generated and used as a "top phrase" list as described herein.

As shown by block 530, a phrase with a trend that is highly correlated with a trend of the list of phrases may be selected and, as shown by block 535, the output (e.g., in the form of a phrase) may be provided to a correlation process that may be as described herein. For example, after a phrase was selected as shown by block 530, an embodiment may verify, as shown by block 535, that a trend of phrase is not correlated with a trend of all interactions, e.g., the phrase is one that is included (or mentioned or uttered) in most of the interactions. As discussed, although a phrase such as "good day" may be selected as shown by block 530, such phrase may be redundant (e.g., it is not specific or relevant to any specific category), accordingly, by ensuring that a phrase is not one that is common to all, or most of the interactions, an embodiment may filter out redundant phrases as shown by block 535 and described herein.

Accordingly, a list of candidate words or phrases may be generated. A candidate list of words or phrases may include phrases that may be further inspected or evaluated in order to determine whether or not to include them in a category of phrases. For example, a list of candidate or phrases (also referred to herein as "top phrases") may be evaluated with respect to an existing category and at least some to the phrases in the list may be added to the category.

In some embodiments of the invention, a phrase-trend for each of the phrases (or candidate phrases) in a top phrase list may be generated and a correlation of the phrase-trend to the trend of the category or list may be determined, identified and/or quantified. Generating a trend for a category or list of phrases may be done as described herein. Generating a trend for each phrase in a top phrase list may be done in a similar way, e.g., using requests as described, service unit 220 may receive, from service engine 230 an array of values of the number of recorded interactions that include a phase and accordingly, a time/value trend may be generated.

As described, correlating trends (or determining, or quantifying, a correlation of trends), may include producing a value (e.g., a value between −1 and +1). Accordingly, after determining a value of the correlation between each of the top phrases and a category, service unit may select, from the top or candidate phases, one or more of the phrases and add the selected phrases to the category. For example, the phrase for which the highest correlation value was seen when correlating the trend of the phrase with a trend of the category may be automatically added to the category. In some embodiments, rather than automatically adding a phrase based on its correlation value the phrase may be presented to a user. For example, UI unit 210 may display the phrase and suggest to add it to a category. Based on input from a user, the phrase may be added to the category. Any number of phrases may be suggested. For example, the top 5 or 10 phrases (e.g., the 5 phrases with the highest correlation values as described) may be presented to a user. In some embodiments, some or even all candidate phrases (or top phrases) may be presented with their respective correlation values (as produced when correlating their trends with a trend of a category), thus, a user may be presented with candidate phrases as well as with their respective correlation with a category. Accordingly, a user may be enabled to select phrases to be added to a category based on their correlation with the category.

In some embodiments, a correlation of a trend of a specific phrase with a trend of all interactions may be calculated or quantified. For example, a trend for all interactions in a time period or interval may be generated based on the total number of interactions in each time slot, e.g., total number of interactions in each minute, hour, day etc. For example, a trend for all interactions may be an interactions-trend as described herein.

In some embodiments, after a list of top phrases is created, each of the phrase may be verified or examined by calculating the correlation value of its trend with a trend for all interactions. In some embodiments, if the correlation value is higher than a threshold then service unit 220 may discard the phrase. Generally, if a trend of a phrase is highly correlated with the trend of all interactions then it may be assumed the phrase contributes little or no additional information or value. For example, the word "hello" or phrase "good morning" may appear in almost every interaction, however, these phrases contribute nothing to an investigation of an issue or problem since they add no relevant information. Accordingly, some embodiments of the invention may filter out phrases that, although appearing in many interactions, do not contribute to, or help, an investigation by verifying that a trend of a phrase (e.g., a candidate phrase) does not highly correlate with a trend of all interactions.

In some embodiments, service unit 220 (possibly using services of search engine 230) may verify or validate that a specific phrase is indeed relevant to an issue or problem. For example, to verify or validate a phrase, service unit 220 may check that the correlation of a base category trend with a trend of the specific phrase is above a first threshold (e.g., R is greater than 0.75) over a selected time period. In order to verify or validate a phrase, service unit 220 may further verify that the correlation of the specific phrase and the trend of all interactions (e.g., the total number of interactions per time interval over a selected time period) is below a second threshold (e.g., below 0.45). As described, if a trend of a phrase highly correlates with the trend of all, or the total number of, interactions then it may be assumed the phrase can be ignored. For example, trends of phrases or words such as "bye" or "bye now" may be very close to, or highly correlated with, the trend that represents the total count of all interactions, e.g., the interactions trend or interactions-trend.

Reference is made to FIG. 6 which shows a system and flows according to illustrative embodiments of the present invention. As shown by block 610, a candidate phrase may be selected, e.g., service unit 220 may search, in interactions associated with a base category, for phrases not yet included in the base category as described, suggest phrases for addition to the base category, and receive, from a user, a selection of a suggested phrase.

As shown by block 615, the trend of the phrase may be correlated with the trend of a list or category of phrase, e.g., the correlation value R as produced by Formula 1 may be calculated using trend values of a phrase and a category as X and Y in Formula 1. As shown by block 630, if the correlation value R as calculated in block 615 is below a threshold the flow may end and, since the trend of the phrase is not correlated with the trend of the list or category of interest, the phrase is not to be added to the category or list.

As shown by block 620, if the correlation value calculated as shown in block 615 is above a threshold, then the correlation value of the phrase trend with the interactions-trend may be calculated, and, if found to be higher or greater than a threshold then the phrase may be discarded or ignored as shown by block 625. As shown by block 635, if the correlation value of the phrase trend with the interactions-trend is below a threshold then the phrase may be suggested to a user, e.g., the phrase may be presented on a monitor of a computer and the user may be enabled to select the phrase for addition to a category. Reference is additionally made to FIG. 7 that shows a screenshot 710 of a user interface according to illustrative embodiments of the present invention. As shown, the phrase "Direct Debit" may be suggested to a user and "Accept"/"Reject" buttons may enable the user to accept or reject the phase. If the user selects accept, service unit may add the phrase to a category or list. Accordingly, a category may be updated based on phrases that are found to highly correlate with a category or list of phrases and that, in addition, do not correlate with the frequency or count per time of the total or entire set of interactions.

Reference is made to FIG. 8 which shows a system and flows according to illustrative embodiments of the present invention. As shown by block 810, a correlation check may be performed e.g., as described herein. For example, a correlation check for a phrase may include verifying that the trend of the phrase (phrase-trend) correlates with a trend of a category (category-trend) with a value higher than a threshold and that further, that the phrase-trend does not correlate with a general trend of interactions, e.g., with an interactions-trend as described herein.

As shown by block 820, a candidate phrase (denoted Pi), e.g., one verified by a correlation check, may be presented to a user, e.g., as shown by screenshot 710. As shown by block 825, user input may be received, e.g., in the form of a selection of a phrase as described with respect to screenshot 710. As shown by block 830, following an acceptance of a user to include a phrase in a category, the accuracy with which the phrase is searched for, in recorded interactions, is optimized, e.g., as described herein.

Reference is made to FIG. 9 that shows exemplary trending values of a category and phrases according to illustrative embodiments of the present invention. As shown, a trend for a time interval starting Jan. 1, 2015 and ending Jan. 22, 2015 may be generated, e.g., by components of system 200 as described herein. The exemplary trends shown in FIG. 9 are related to an exemplary case in which a base category includes the phrases "bill", "account" and "pay".

As shown, the exemplary trends shown in FIG. 9 include, for a base category and for a set of phrases, the number of recorded interactions, per day, that include the phrases included in the base category (column 910), the number of recorded interactions, per day, that include the phrase "direct debit" (column 915), the number of recorded interactions, per day, that include at least one of the phrases "cancel my contract" and "cancel the contract" (column 920), the number of recorded interactions, per day, that include the phrase "contract" and so on.

Of course, trends as shown by FIG. 9 may be generated by an embodiment for any time period or interval. Trends as shown by FIG. 9 may be generated by an embodiment for, or according to any, resolution. For example, instead of number of recorded interactions per day, a trend may be generated for number of recorded interactions per hour or event minute or per week or month.

Figure 10:
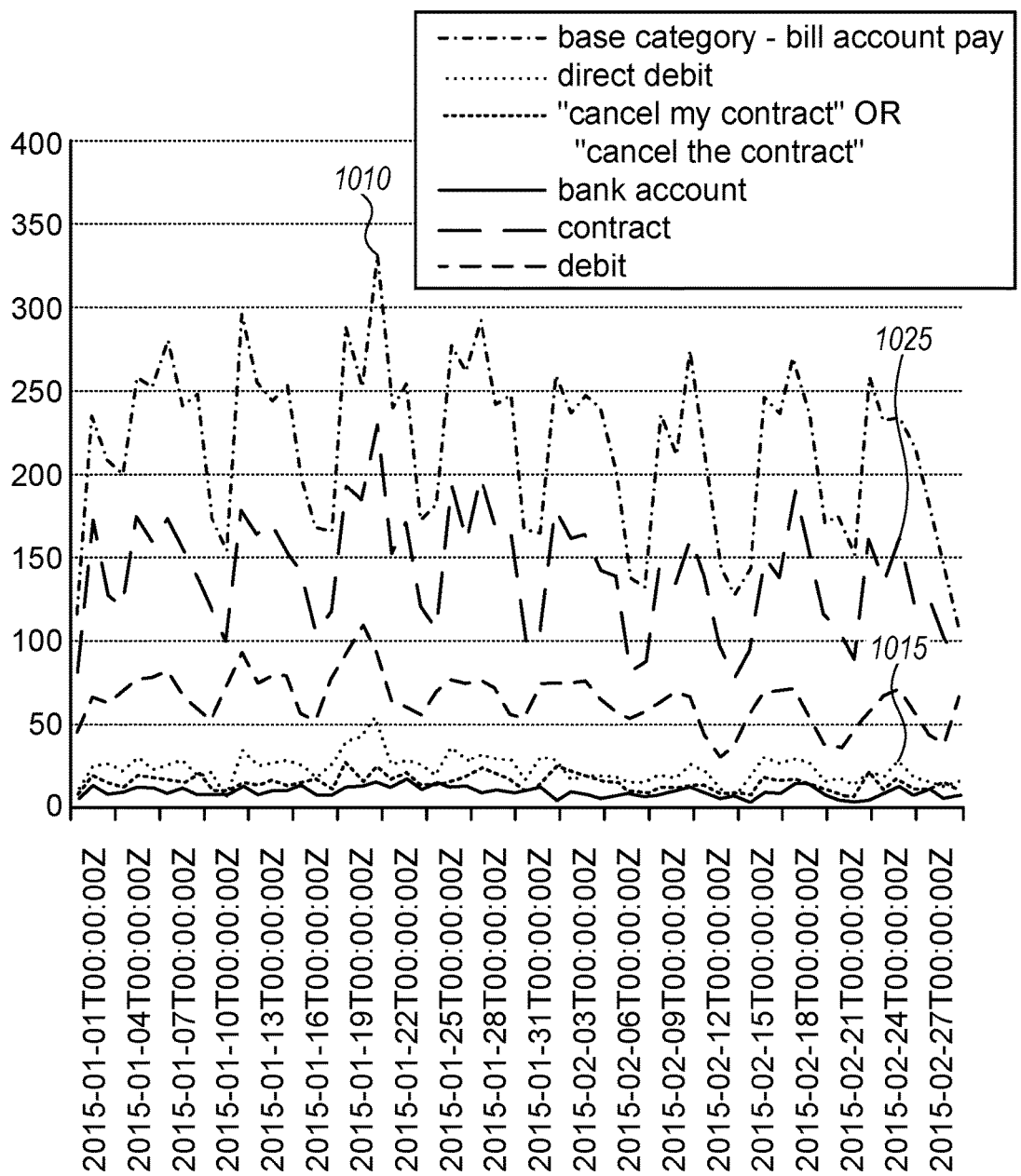
FIG. 10 graphically shows exemplary trends according to illustrative embodiments of the present invention.

Reference is made to FIG. 10 that graphically shows exemplary trends according to illustrative embodiments of the present invention. For example, trend curve or graph

1010 represents the base category, as can be seen, the number of interactions in which at least one of the phrases "bill", "account" and "pay" (the base category) was mentioned was high around Jan. 19, 2015 and low around Jan. 25, 2015. As can further be seen, the trend of the phrase "contract" shown by curve 1025 has a high correlation with the trend of the base category (1010). Similarly, it can be seen the correlation of the phrase "direct debit" with the trend of the base category is low, e.g., trend 1015 does not rise nor falls when trend 1010 does.

Figures 11, 12:
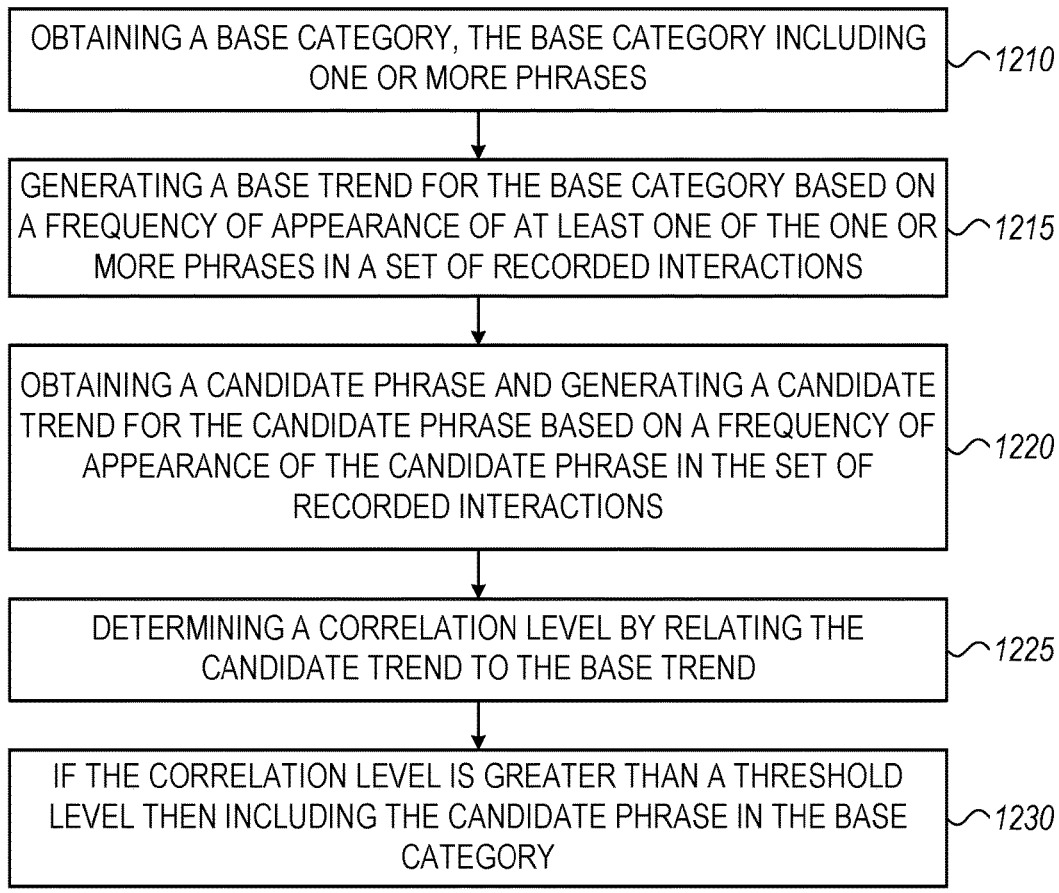
FIG. 11 shows exemplary correlation values according to illustrative embodiments of the present invention.
FIG. 12 shows a method according to illustrative embodiments of the present invention.

Reference is made to FIG. 11 that shows exemplary correlation values according to illustrative embodiments of the present invention. Table 1110 shows the correlation values of the phrases shown in FIG. 9 and FIG. 10 and described in related text. For example, and as shown, the correlation of the phrase "contract" with the base category is relatively high (0.951) and the correlation of the phrase "bank account" with the base category is relatively low (0.495). Accordingly, an embodiment may determine that the phrase "contract" (that has the highest correlation score) is relevant, in the time period that was used (e.g., January 2015) and may therefor suggest, to a user, to add the phrase "contract" to the base category that already includes "bill", "account" and "pay". In some embodiments, the order by which phrases are suggested to a user is based on their respective correlation score or value. For example, after service unit 220 suggests "contract", service unit 220 may suggest to add the phrase "direct debit" to the base category since the phrase " " has the next highest correlation score (0.773) as shown by table 1110.

It will be noted that a correlation (and therefore, phrases identified, suggested to a user and/or added to a category) may be different for different time periods and a user may select the time period over which an embodiment will generate and update phrase categories as described.

Reference is made to FIG. 12 which shows a method according to illustrative embodiments of the present invention. As shown by block 1210, a base category that includes one or more phrase may be obtained, e.g., received from a user, by service unit 220 as described. As shown by block 1215, a trend for the base category may be generated based on a frequency of appearance of at least one of the one or more phrases in a set of recorded interactions. For example, using services of search engine 230, service unit may obtain the number of recorded interactions, in storage system 231, that include any one of the phrases in a base category. As described, a time interval of interest may be received from a user and trends as described herein may be related or relevant to the time interval or period.

As shown by block 1220, a candidate phrase may be obtained (e.g., identified by service unit 220 or received from a user as described herein) and a candidate trend may be generated for the candidate phrase based on a frequency of appearance of the candidate phrase in the set of recorded interactions as described herein. As described, a candidate phrase may be obtained by one of: receiving the candidate phrase from a user and identifying the candidate phrase by analyzing a set of recorded interactions. For example, service unit 220 may obtain a candidate phrase by identifying phrases that frequently appear in a set of recorded interaction associated with a category.

As shown by block 1225, a correlation level, score or value may be determined or calculated for, or based on, the trends of the candidate phrase and the base category, e.g., as described herein. As shown by block 1230, if the correlation level is greater than a threshold level then the candidate phrase may be included in, or added to, the base category.

For example, service unit 220 may automatically add phrases to a category based on a correlation score, lever or value determined by correlating trends as described herein.

A process of determining a correlation level, value or score, for a candidate phrase and, including the candidate phrase in the base category based on the correlation level or value may be iteratively repeated for a set of phrases. For example, service unit 220 may iteratively select a candidate phrase from a set of candidate phrases, e.g., from a set of phrases automatically identified by service unit 220 as described and, for each selected candidate phrase, service unit 220 may generate a candidate trend, determine a correlation score, value or level for the selected candidate phrase with respect to a base category or phrase list, and, if the correlation level is greater than a threshold level then service unit 220 may include the selected candidate phrase in the base category.

An automated flow or method for generating a trend for a candidate phrase may include for example: (a) determining a frequency of appearance of the candidate phrase, in a set of recorded interactions, by searching for the candidate phrase according to an accuracy value, (b) generating a first candidate trend based on the frequency of appearance determined using the accuracy value, (c) decreasing the accuracy value to produce a decreased accuracy value, (d) generating a second candidate trend using the decreased accuracy value, (e) determining a correlation level by relating the first candidate trend to the second candidate trend, and if the correlation level is greater than a threshold level then repeating steps a, b, c, d and e.

If in step (e) it is determined that the correlation level is less than a threshold then selecting, for generating the candidate trend, an accuracy value that is larger than the last decreased accuracy value used. For example, the flow described herein with reference to FIG. 4 describes a process that may be carried out by service unit 220 and that includes iteratively decreasing an accuracy with which a phrase is searched for in recorded interactions until an optimal accuracy is achieved.

A system according to some embodiments may include more than one processor, CPU or controller. For example, system 200 described herein may include a first controller 105 included in service unit 220 and second controller 105 included in search engine 230 and system 200 may use the two controllers in order to perform or carry out a method of generating phrase based categories as described.

An embodiment may user specific algorithms and formulas. For example, an embodiment may use formula 1 to calculate a correlation value of trends and may further use specific algorithms or logic for creating phrase categories based on correlation values of trends as described. Some embodiments of the invention greatly improve related technologies and technical fields. For example, the technology of identifying recorded interactions, creating categories of recorded interactions and associating recorded interactions with categories is greatly improved by an automated procedure and/or system that automatically generates phrase based categories as described. A functioning of a computer may be improved or extended by some embodiments of the invention, e.g., as described, a computer or controller may automatically generate phrase based categories as described, something known computerized systems and methods are unable to do. Accordingly, some embodiments of the invention address the computer-centric challenge of automatically generating phrase based categories. Some embodiments use specific computer-related data formats, e.g., audio recordings of interactions stored in a database, requests and responses (e.g., as supported by search engine 230) and the like. It is noted that embodiments of the invention do not merely manipulate or examine digital information or other data but also generate and create new data, e.g., calculate, produce and use correlation values and generate and update phrase categories as described.

As described, generating a candidate trend may include ascertaining that the candidate trend is different from a trend of the number of interactions per time period. For example, if a trend of a phrase per minute, hour or day is similar to a trend that merely represents the number of calls per minute, hour or day then service unit 220 may determine that the trend is not different from a trend of the number of interactions per time period and may further determine that the phrase is insignificant and should not be included in a category. In some embodiments, service unit 220 may ascertain that a candidate trend is statistically more correlated to the trend of a base category than to the trend of the number of interactions in a time period. For example, service unit 220 may check the correlation values of a phrase-trend with a trend of a category and with a trend of total interactions and, if the correlation value related to the total interactions is greater than the one related to the base category then the phrase may be ignored, e.g., not shown or suggested to a user.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer-implemented method of generating phrase based categories for interactions recorded at a call center, the method comprising:
    displaying, using a computer processor, a graphical user interface to a user, the graphical user interface comprising: an input area for the user to input a base category and one or more phrases, for analysis of the base category, and an input area for the user to input a candidate phrase for analysis;
    obtaining via user input the base category;
    generating, using the computer processor, a base trend for the base category based on a frequency of appearance of at least one of the one or more phrases in a set of recorded interactions that are specific to the call center, the base trend comprising a series of numbers of interactions per time unit for each of a series of time units, each recorded interaction comprising a text recording of a conversational exchange, wherein at least some of the text recordings are produced via a speech to text process applied to an audio recording;
    obtaining via user input the candidate phrase;
    generating, using the computer processor, an accuracy value for the candidate phrase by determining a correlation between: a first candidate trend determined based on the frequency of appearance of the candidate phrase in the set of recorded interactions determined using a first accuracy value; and a second candidate trend determined based on the frequency of appearance of the candidate phrase in the set of recorded interactions determined using a second accuracy value;
    generating, using the computer processor, a candidate trend for the candidate phrase based on a frequency of appearance of the candidate phrase in the set of recorded interactions determined using the generated accuracy value, each of the candidate trend, the first candidate trend, and the second candidate trend comprising a series of numbers of interactions per time unit for each of a series of time units;
    calculating, using the computer processor, a correlation level for the candidate trend based on the candidate trend and the base trend, wherein the correlation level quantifies a difference in a behavior of the candidate trend and the base trend;
    if the correlation level is greater than a threshold level then including, using the computer processor, the candidate phrase in the base category; and
    displaying to the user the candidate phrase.

2. The method of claim 1, comprising:
    iteratively selecting a candidate phrase from a set of candidate phrases, and, for each selected candidate phrase:
        generating a candidate trend for the selected candidate phrase,
        determining a correlation level for the selected candidate phrase, and
        if the correlation level is greater than a threshold level then including the selected candidate phrase in the base category.

3. The method of claim 1, comprising:
    including the candidate phrase in the base category based on the input received from the user.

4. The method of claim 1, wherein generating the candidate trend includes ascertaining that the candidate trend is different from a trend of the number of interactions per time period.

5. The method of claim 1, comprising, ascertaining that the candidate trend is statistically more correlated to the trend of the base category than to a trend of the number of interactions in a time period.

6. A computer-implemented method of generating phrase categories for interactions recorded at a call center, the method comprising:
    displaying, using a computer processor, a graphical user interface to a user, the graphical user interface comprising: an input area for the user to input a base category and one or more phrases, for analysis of the base category, and an input area for the user to input a candidate phrase for analysis;
    obtaining via user input the base category;
    obtaining via user input the candidate phrase;
    defining a reference phrase category that includes one or more phrases;
    generating, using the computer processor, a base trend of the reference phrase category, wherein a trend of a category is defined by a set of values representing a number of recorded interactions that are specific to the call center, in a respective set of time units, that include at least one phrase included in the category, each recorded interaction comprising a text recording of a conversational exchange, wherein at least some of the text recordings are produced via a speech to text process applied to an audio recording;

generating, using the computer processor, an accuracy value for the candidate phrase by determining a correlation between: a first candidate trend determined based on the frequency of appearance of the candidate phrase in the set of recorded interactions determined using a first accuracy value; and a second candidate trend determined based on the frequency of appearance of the candidate phrase in the set of recorded interactions determined using a second accuracy value;

generating, using the computer processor, a candidate trend of the candidate phrase based on a frequency of appearance of the candidate phrase in the set of recorded interactions determined using the generated accuracy value, each candidate trend comprising a series of numbers of interactions per time unit for each of a series of time units;

calculating, using the computer processor, a correlation level based on the candidate trend and the base trend; and if the correlation level is greater than a threshold level then, using the computer processor, including the candidate phrase in the base category; and displaying to a user the candidate phrase.

7. The method of claim 6, comprising:
iteratively selecting a candidate phrase from a set of candidate phrases, and, for each selected candidate phrase:
   generating a candidate trend for the selected candidate phrase,
   calculating a correlation value for the selected candidate phrase, and
   if the correlation value is greater than a threshold level then including the selected candidate phrase in the base category.

8. The method of claim 6, comprising:
including the candidate phrase in the base category based on input received from the user.

9. A system comprising:
a memory; and
a controller configured to:
   display a graphical user interface to a user, the graphical user interface comprising: an input area for the user to input a base category and one or more phrases, for analysis of the base category, and an input area for the user to input a phrase for analysis;
   obtain via user input the base category;
   generate a base trend for the base category based on a frequency of appearance of at least one of the one or more phrases in a set of recorded interactions that are specific to a call center, the base trend comprising a series of numbers of interactions per time unit for each of a series of time units, each recorded interaction comprising a text recording of a conversational exchange, wherein at least some of the text recordings are produced via a speech to text process applied to an audio recording;
   obtain via user input a candidate phrase;
      generate an accuracy value for the candidate phrase by determining a correlation between: a first candidate trend determined based on the frequency of appearance of the candidate phrase in the set of recorded interactions determined using a first accuracy value; and a second candidate trend determined based on the frequency of appearance of the candidate phrase in the set of recorded interactions determined using a second accuracy value;
   generate a candidate trend for the candidate phrase based on a frequency of appearance of the candidate phrase in the set of recorded interactions determined using the generated accuracy value, each of the candidate trend, the first candidate trend, and the second candidate trend comprising a series of numbers of interactions per time unit for each of a series of time units;
   determine a correlation level by relating the candidate trend to the base trend;
   if the correlation level is greater than a threshold level then include the candidate phrase in the base category; and
   displaying to the user the candidate phrase.

10. The system of claim 9, wherein the controller is further configured to:
include the candidate phrase in the base category based on input received from the user.

11. The system of claim 9, wherein generating the candidate trend includes:
   a. determining a frequency of appearance of the candidate phrase, in the set of recorded interactions, by searching for the candidate phrase according to an accuracy value,
   b. generating a first candidate trend based on the frequency of appearance determined using the accuracy value,
   c. decreasing the accuracy value to produce a decreased accuracy value,
   d. generating a second candidate trend using the decreased accuracy value,
   e. determining a correlation level by relating the first candidate trend to the second candidate trend, and if the correlation level is greater than a threshold level then repeating steps a, b, c, d and e; and
   if the correlation level is less than a threshold then selecting, for generating the candidate trend, an accuracy value that is larger than the last decreased accuracy value used.

12. The method of claim 9, wherein generating the candidate trend includes ascertaining that the candidate trend is different from a trend of the number of interactions per time period.

13. The system of claim 9, wherein the controller is further configured to ascertain that the candidate trend is statistically more correlated to the trend of the base category than to a trend of the number of interactions in a time period.

14. The system of claim 9, wherein recorded interactions include at least one of: a voice recording, a video recording and a recording of text of a textual interaction.

* * * * *